(12) United States Patent
Guo et al.

(10) Patent No.: US 8,874,827 B2
(45) Date of Patent: Oct. 28, 2014

(54) PAGE MERGING FOR BUFFER EFFICIENCY IN HYBRID MEMORY SYSTEMS

(75) Inventors: Xiaochen Guo, Rochester, NY (US); Arun Jagatheesan, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 13/453,919

(22) Filed: Apr. 23, 2012

(65) Prior Publication Data
US 2013/0042059 A1    Feb. 14, 2013

Related U.S. Application Data

(60) Provisional application No. 61/521,693, filed on Aug. 9, 2011.

(51) Int. Cl.
*G06F 12/00* (2006.01)
*G06F 12/02* (2006.01)
*G06F 12/06* (2006.01)

(52) U.S. Cl.
CPC ........ *G06F 12/0638* (2013.01); *G06F 12/0246* (2013.01)
USPC .......................................................... 711/103

(58) Field of Classification Search
CPC combination set(s) only.
See application file for complete search history.

(56) References Cited

U.S. PATENT DOCUMENTS

2013/0132681 A1* 5/2013 Wang et al. .................. 711/137

OTHER PUBLICATIONS

G. Dhiman, R. Ayoub, and T. Rosing. "*PDRAM: A hybrid PRAM and DRAM main memory system*," DAC '09, Jul. 26-31, 2009, San Francisco, CA USA.
B. C. Lee, E. Ipek, O. Mutlu, and D. Burger. "*Architecting phase change memory as a scalable DRAM alternative*," International Symposium on Computer Architecture (ISCA), ISCA'09, Jun. 20-24, 2009, Austin, Texas, USA.
M. K. Qureshi, V. Srinivasan, and J. A. Rivers. "*Scalable high-performance main memory system using phase-change memory technology*," International Symposium on Computer Architecture (ISCA-2009) Jul. 28, 2009.
K. Sudan, N. Chatterjee, D. Nellans, M. Awasthi, R. Balasubramonian, and A. Davis. "*Micro-pages: increasing DRAM efficiency with locality-aware data placement*," ASPLOS'10, Mar. 13-17, 2010, Pittsburgh, Pennsylvania, USA.
M. K. Qureshi, M. A. Suleman, and Y. N. Patt. "*Line distillation: increasing cache capacity by filtering unused words in cache lines*," HPCA '07 Proceedings of the 2007 IEEE 13th International Symposium on High Performance Computer Architecture.

* cited by examiner

*Primary Examiner* — Brian Peugh
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method for managing memory in a hybrid memory system is provided, wherein the hybrid memory system has a first memory and a second memory, wherein the first memory is smaller than the second memory and the first and second memories are of different types, the method comprising: identifying two or more pages in the first memory that are compatible with each other based at least in part on a prediction of when individual blocks within each of the two or more pages will be accessed; merging the two or more compatible pages, producing a merged page; and storing the merged page in the first memory.

20 Claims, 6 Drawing Sheets

PAGE MERGING FOR BUFFER EFFICIENCY IN HYBRID MEMORY SYSTEMS

CROSS REFERENCE TO RELATED APPLICATIONS

This application claims the benefit of priority under 35 U.S.C. §119(e) to U.S. Provisional Patent Application No. 61/521,693, filed on Aug. 9, 2011, which is incorporated herein by reference in its entirety for all purposes.

BACKGROUND OF THE INVENTION

1. Field of the Invention

The present invention relates generally to computer memory architecture. More specifically, the present invention relates to a technique to improve the buffer efficiency of hybrid memory systems.

2. Description of the Related Art

There are a large number of different types of memories available for user in computer systems. Random Access Memory (RAM) is typically a fast-access memory that is used for frequent memory reads and writes in a computer system. Common types of RAM include Dynamic RAM (DRAM), Static RAM (SRAM), spin-torque transfer memory random access memory (STT-MRAM) and Phase Change Memory (PCM), among others. RAM is vital for all forms of computing today, from small devices to large data centers.

Each memory type has its advantages and disadvantages in terms of latency/performance, capacity, energy usage, etc. For example, PCM is non-volatile (i.e., it maintains its contents when power is interrupted), whereas DRAM is volatile. PCM also has better scalability than DRAM. DRAM, however, has significantly better write speeds, and slightly better read speeds than PCM. In other words, PCM has longer access latency. PCM also uses more energy when writing, and has limited write endurance. As such, one must sacrifice the advantages of one type of memory when using another type of memory instead. What is needed is a solution that addresses these issues.

SUMMARY OF THE INVENTION

In a first embodiment of the present invention, a method for managing memory in a hybrid memory system is provided, wherein the hybrid memory system has a first memory and a second memory, wherein the first memory is smaller than the second memory and the first and second memories are of different types, the method comprising: identifying two or more pages in the first memory that are compatible with each other based at least in part on a prediction of when individual blocks within each of the two or more pages will be accessed; merging the two or more compatible pages, producing a merged page; and storing the merged page in the first memory.

In a second embodiment of the present invention, a method for managing memory in a hybrid memory system is provided, wherein the hybrid memory system has a first memory and a second memory, wherein the first memory is smaller than the second memory and the first and second memories are of different types, the method comprising: receiving a memory request; attempting to serve the memory request by accessing the first memory; when the first memory cannot fulfill the memory request: retrieving a memory page from the second memory, wherein the memory page can fulfill the memory request; placing the memory page in the first memory; determining if the first memory is full; when the first memory is full: determining whether individual blocks within each page in the first memory are useful, based upon a prediction of when the individual blocks will be accessed in the near future; identifying at least two pages in the first memory that are compatible with each other; merging the two pages and producing a merged page; and storing the merged page in the first memory.

In a third embodiment of the present invention, a hybrid memory system is provided comprising: a first memory; a second memory, wherein the second memory is of a different type than the first memory and is larger than the second memory; a memory controller configured to identify two or more pages in the first memory that are compatible with each other based at least in part on a prediction of when individual blocks within each of the two or more pages will be accessed; merge the two or more compatible pages, producing a merged page; and store the merged page in the first memory.

In a fourth embodiment of the present invention, an apparatus for managing memory in a hybrid memory system is provided, wherein the hybrid memory system has a first memory and a second memory, wherein the first memory is smaller than the second memory and the first and second memories are of different types, the apparatus comprising: means for identifying two or more pages in the first memory that are compatible with each other based at least in part on a prediction of when individual blocks within each of the two or more pages will be accessed; means for merging the two or more compatible pages, producing a merged page; and means for storing the merged page in the first memory.

In a fifth embodiment of the present invention, a non-transitory program storage device readable by a machine tangibly embodying a program of instructions executable by the machine to perform a method for managing memory in a hybrid memory system is provided, wherein the hybrid memory system has a first memory and a second memory, wherein the first memory is smaller than the second memory and the first and second memories are of different types, the method comprising: identifying two or more pages in the first memory that are compatible with each other based at least in part on a prediction of when individual blocks within each of the two or more pages will be accessed; merging the two or more compatible pages, producing a merged page; and storing the merged page in the first memory.

DETAILED DESCRIPTION OF SPECIFIC EMBODIMENTS

Figure 1:
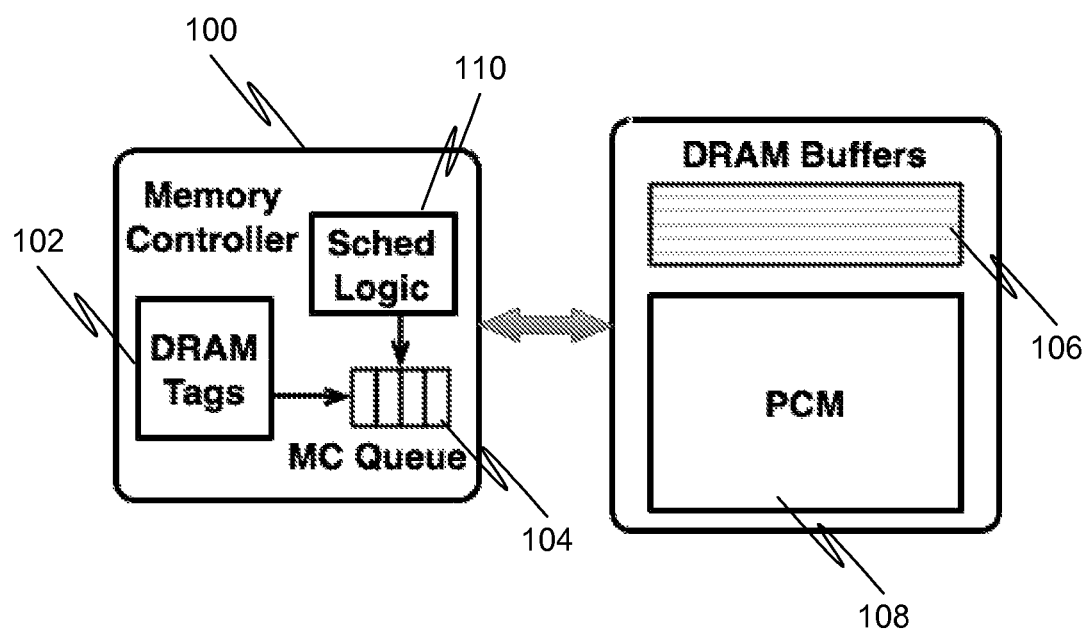
FIG. 1 is a block diagram illustrating a DRAM-PCM architecture that can be used to implement an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, a hybrid memory system is provided so that the advantages of one type of memory (in terms of latency or energy efficiency, for example) can effectively be used while masking the other type of memory's disadvantages. The inventors of the present invention noticed that when implementing such a hybrid memory system, such as by creating a hybrid PCM and DRAM architecture, efficiency is low. This is because memory is organized in page granularity in the consideration of density. This can be inefficient because blocks within a page have different locality features. As such, the inventors of the present invention realized that there is an opportunity to improve DRAM buffer efficiency because temporal locality at the block level is likely to be filtered by on-chip caches, and useless blocks can be detected and evicted.

Due to density consideration, main memory is usually organized in page granularity. Hence, the migration and allocation are also in relatively large granularity to minimize the overhead of bookkeeping. For a hybrid memory system with buffers, the hope is that there is a high temporal locality at page level, so that once a page is migrated to the fast, non-PCM part, it is likely to be referred to many times in the near future, thus necessitating fewer moving efforts. But many memory intensive applications have large memory footprints within a short time interval, meaning that the smaller buffers typically utilized are often not enough to hold all the pages that are being accessed recently.

In an embodiment of the present invention, compatible pages within one type of memory are merged to save space when the buffer is full. Individual blocks within pages can be determined to be likely to be accessed shortly (the mechanisms for making such a determination will be described in more detail below). Blocks that are likely to be accessed shortly may be called "useful", whereas blocks that are unlikely to be accessed shortly may be termed "useless". Pages are determined to be compatible if the useful blocks from one page can be successfully integrated with the useful blocks from another page, without the loss of any useful blocks. The mechanisms by which this can be determined are also described in more detail below.

FIG. 1 is a block diagram illustrating a DRAM-PCM architecture that can be used to implement an embodiment of the present invention. It is intended only as an example. The present invention can be utilized with any hybrid memory system having a slower type of memory with a faster type of memory being used as a (smaller) buffer. In FIG. 1, a per-channel memory controller 100 is provided that can interface to both DRAM and PCM memory, so that the latency of copying a page from one to another can be hidden in the background. Since the internal timing of PCM and DRAM accesses are different, the memory controller 100 then should be aware of which blocks are in the DRAM buffer, for example by having a DRAM tag table 102 inside the memory controller 100. The DRAM tag table 102 can be structured as a Content Addressable Memory (CAM) connected with a row ID encoder for accessing the DRAM buffer. Every memory request consults the DRAM tag table 102 after address mapping and before entering the memory controller queue 104. If the memory request accesses a block in the DRAM 106, it is scheduled according to DRAM timing and the row ID can be replaced by the DRAM buffer index. Otherwise, it is scheduled according to PCM timing and stored in PCM 108, in accordance with scheduling logic 110.

Figure 2:
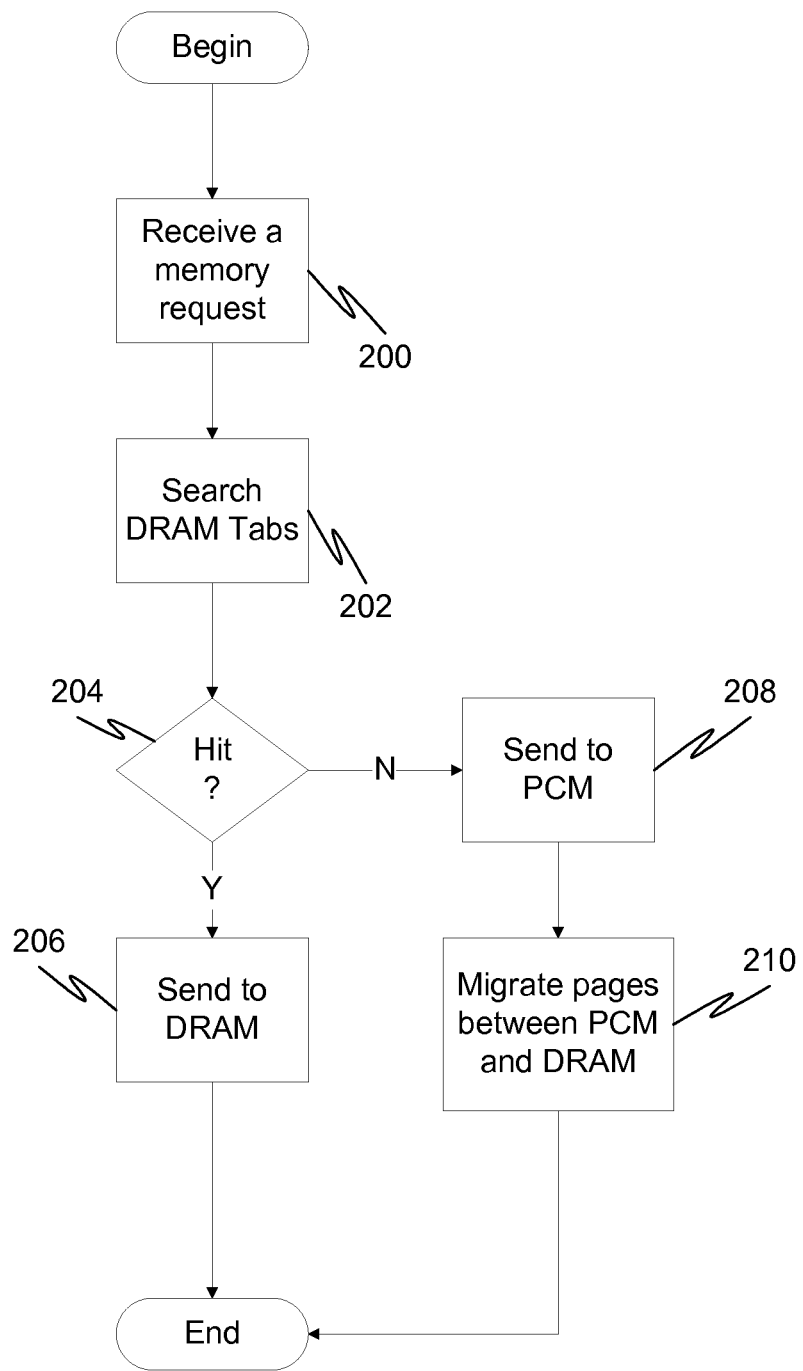
FIG. 2 is a flow diagram illustrating scheduling logic in accordance with an embodiment of the present invention.

FIG. 2 is a flow diagram illustrating scheduling logic in accordance with an embodiment of the present invention. At 200, a memory request is received. At 202, DRAM tabs are searched for a hit on the memory request. At 204, it is determined if a hit has occurred. If so, then at 206 the memory request is sent to DRAM. Otherwise, at 208 the request is sent to PCM. At 210, pages are migrated between PCM and DRAM to better improve the hit ratio in DRAM. It should be noted that this migration can also occur at other times, such as periodically or during on-demand pre-fetching.

A DRAM buffer can be organized in various granularities: a large granularity results in a smaller DRAM tag table but lower buffer efficiency, whereas smaller granularity is more efficiency but results in a larger DRAM tag table. In an embodiment of the present invention, an approach is followed where pages are interleaved at a smaller granularity.

Figure 3:
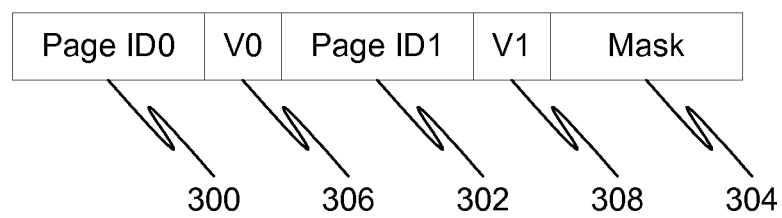
FIG. 3 depicts an entry in a DRAM tag table in accordance with an embodiment of the present invention.

FIG. 3 depicts an entry in a DRAM tag table in accordance with an embodiment of the present invention. Two tags 300, 302 and an ownership mask 304 are used to index the merged pages. A "0" in the ownership mask indicates that the corresponding block belongs to Page $ID_0$ whereas a "1" indicates that the corresponding block belongs to Page $ID_1$. For a 4 GB memory with 4 KB page size and 64B block size, each tag may be 21 bits per page (20 bit page ID and one valid bit). If the DRAM buffer is organized at block level, the size of tags of the number of blocks at equivalent page size is 1728 bits; whereas for page merging at block level, the size of tags is 106 bits (two tags and a 64-bit mask). While page merging is less flexible than small granularity buffering, it is more storage efficient.

As described above, the page merging process is based upon a prediction as to whether a block within a page is going to be referred in the near future or not. The assumption of the proposed policy is that most temporal locality has been filtered by the cache, which means that many blocks may be accessed once or twice in a short time interval. As such, one simple prediction scheme could be based on whether a block has been written back from caches or not. If a memory is fetched from memory (e.g., PCM) to caches (e.g., DRAM), it is likely to be written back if it gets dirty. Hence, if a block is fetched from memory but has not been written back yet, it is predicted to be useful in the near future. The $V_0$ 306 and $V_1$ 308 bits are used as indicators. If $V_0$ and $V_1$ are both set to "1", this means the DRAM buffer entry has two merged pages (and thus the mask 304 is used to identify which of the two original pages the block belongs to). Whereas if only one of $V_0$ and $V_1$ are set to "1", this means that the corresponding DRAM buffer entry has an unmerged page, and the mask 304 is used as usefulness prediction bits before merging.

A page-level least-recently used (LRU) algorithm can also be used together with page merging. When the DRAM buffer is full, a page from the LRU position is chosen to merge with another compatible page, found prioritized to the LRU order. For blocks that are frequently accessed, the page-level LRU ordering helps to keep them out of the merging. Therefore, a LRU stack can be used. Each entry of the LRU stack contains a pointer to a DRAM buffer entry.

Figure 4:
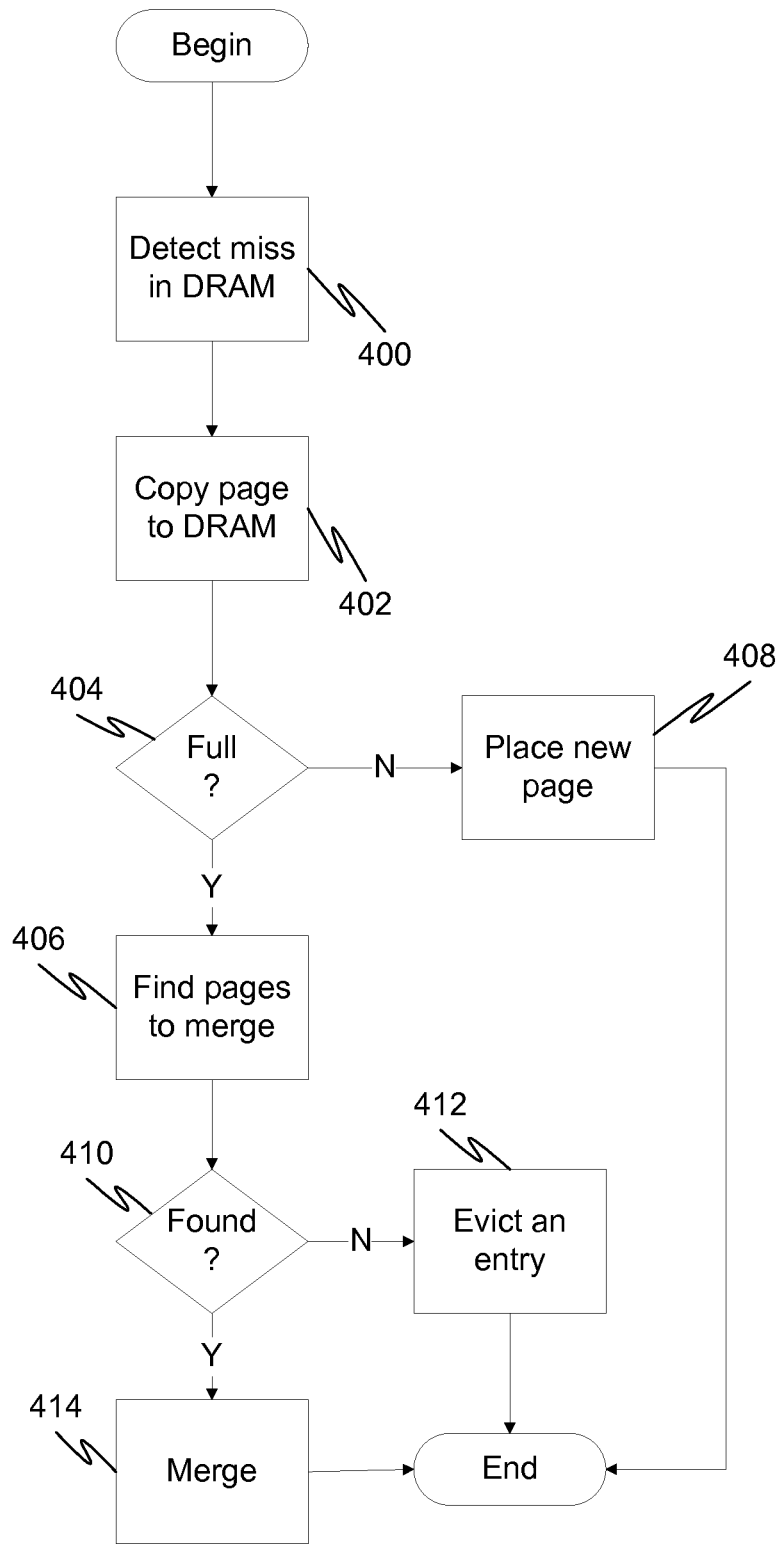
FIG. 4 is a flow diagram illustrating page merging in accordance with an embodiment of the present invention.

FIG. 4 is a flow diagram illustrating page merging in accordance with an embodiment of the present invention. At 400, a miss in DRAM has occurred. At 402, the page is copied from PCM to DRAM. At 404, it is determined if the DRAM buffer is full. If not, then at 406 the new page is placed in the DRAM buffer. If so, then at 408, two compatible pages are found to merge. At 410 it is determined if two such compatible pages are found. If not, then at 410 an entry must be evicted (probably the LRU page). If so, then at 412 the two compatible pages are merged.

Figure 5:
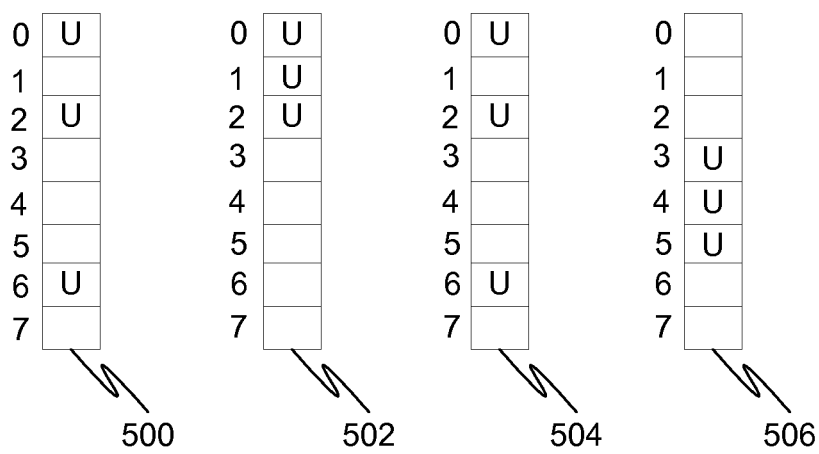
FIG. 5 is a diagram illustrating an example of potentially compatible pages.

Whether or not two (or more) pages are compatible can be determined in various different ways. In a first embodiment of the present invention, pages are deemed compatible if only one of the pages has useful blocks in the same corresponding locations in the respective pages. FIG. 5 is a diagram illustrating an example of potentially compatible pages. There are four pages 500, 502, 504, 506. A "U" in a block indicates that the block is considered useful. In this first embodiment of the present invention, page 500 is considered to be compatible with 506 but not with 502 or 504. This is because page 500 has, for example, a useful block at location 0 while pages 503 and 504 also have useful blocks at location 0. Page 506, however, does not have a useful block at location 0. Furthermore, page 506 does not have useful blocks at any locations where Page 500 has useful blocks. As such, these pages can be merged directly, with the useful blocks in locations 1, 3, 4, and 5 of page 506 merged into the corresponding locations 1, 3, 4, and 5 of page 500, which do not have useful blocks. It should be noted that in some cases these non-useful blocks may be clean, but in other cases they may contain dirty data. In cases that the non-useful data are clean, they can simply be purged from the merged page.

In a second embodiment of the present invention, reverse compatibility is used. Here, the ordering of blocks within a page can be reversed to determine if such a reversal results in a compatible page. In FIG. 5, for example, page 500 is reverse compatible with page 504. This is because reversing the blocks in page 504 results in useful bits in locations 1, 5, and 7, which do not contain useful blocks in page 500.

There may be, of course, other ways that compatible pages could be determined. For example, the locations of the blocks in a page can be shuffled or otherwise randomized, or the available locations in one page can be used to deliberately move blocks from another page to compatible locations. More complicated shuffling mechanism, such as shifting left or right, to increase the chances of merging. The present document will focus, however, on the first and second embodiments because these embodiments require the least amount of overhead and processing time.

Figure 6:
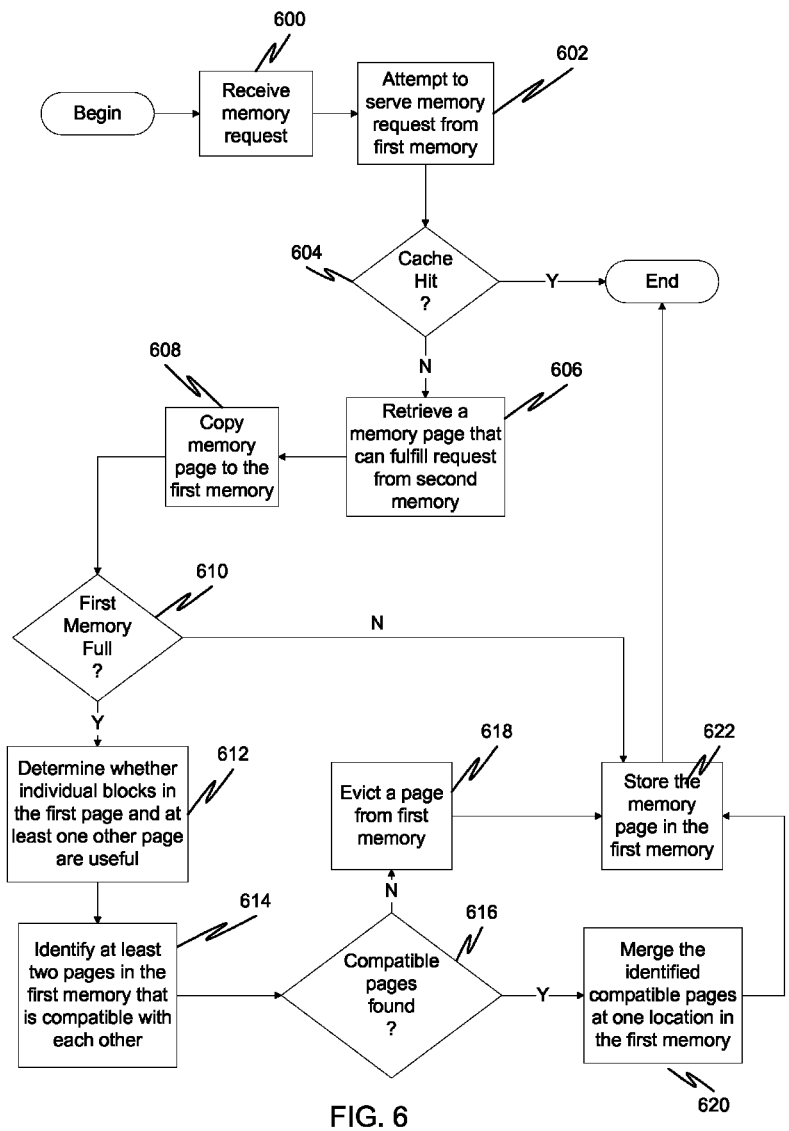
FIG. 6 is a flow diagram illustrating a method for managing memory in a hybrid memory system in accordance with an embodiment of the present invention.

FIG. 6 is a flow diagram illustrating a method for managing memory in a hybrid memory system in accordance with an embodiment of the present invention. At 600, a memory request is received. At 602, the memory request is attempted to be served by accessing the first memory. The first memory may be a "cache" and the attempt may include trying to retrieve data from the cache that fulfills the request. A failure to find such data is called a "cache miss". A success is called a "cache hit." At 604 it is determined if a cache miss or hit has occurred. If a cache hit occurs, the system has fulfilled the memory request and the process can end. If a cache miss occurs, then at 606 a memory page is retrieved from the second memory, wherein the memory page can fulfill the memory request. At 608, this memory page is then copied from the second memory. At 610, it is determined if the first memory is now full. If not, the memory page is placed in first memory 622, the process may end. If so, then the system may move on to merging pages in order to make memory page fit in the first memory. This may include, at 612, determining whether individual blocks within each page in first memory are useful. As described earlier, a block can be called useful if it is predicted to be accessed shortly. A simple way to make this prediction is simply to assume that all pages that have not been written back from the first memory are useful.

At 614, at least two pages in the first memory are identified that they are compatible with each other. At 616, it is determined if at least one pair of the compatible pages are found. If not, then at 618 a page (either merged or not) is evicted from the first memory. If so, then at 620 the system may move on to merge the compatible pages and the merged page is stored at one location in the first memory 620. After either a page merge 620 or a page eviction 618, an available space is create for the copied memory page to be placed in first memory.

As described above, the proposed page merging technique is not limited to a DRAM/PCM hybrid memory. It is also applicable to any two layers in a memory hierarchy. Compared to total fine-granularity organization, page merging has lower overhead under certain circumstances. Let the ratio between the size of coarse-granularity unit and the size of the fine-granularity unit to be R, and the size of the coarse-granularity tags to be T. Then the tag overhead of the total fine-granularity organization is $R \times (T+\log_2 R)$, whereas the tag overhead of page merging is $2 \times T+R$. The overhead of page merging is less than fine-granularity organization when $2 \times T+R$ is smaller than $R \times (T+\log_2 R)$.

Various experiments were undertaken to measure the results of using a hybrid memory system in accordance with the presence invention. In these experiments, a DRAM buffer was utilized. The miss rate was counted for both the page-structured DRAM buffer (as a baseline) and the page-merging algorithm. Both use LRU at page level and consider pages or blocks that have not been written back as useful in the near future. The results show that with a 64 KB DRAM buffer per channel, the miss rate in the DRAM buffer for the baseline is 4%. The results then found that page merging can reduce the DRAM miss rate by 60%. For certain data, the baseline miss rate is low already, so there is temporal locality at the page already. Even in such instances, page merging had a noticeable reduction of miss rate.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for managing memory in a hybrid memory system, wherein the hybrid memory system has a first memory and a second memory, wherein the first memory is smaller than the second memory, and wherein the first and second memories are of different types, the method comprising:
   identifying two or more pages in the first memory that are compatible with each other based at least in part on a prediction of when individual blocks within each of the two or more pages will be accessed;
   merging the two or more compatible pages, producing a merged page; and
   storing the merged page in the first memory.

2. The method of claim 1, wherein the prediction of when individual blocks within each of the two or more pages will be accessed includes a determination of whether the individual blocks have not been written back from the first memory.

3. The method of claim 1, wherein the identifying includes:
   identifying useful blocks within each of the two or more pages, wherein a useful block is one that is predicted to be accessed within a certain time period.

4. The method of claim 3, wherein the two or more pages are compatible with each other if they each have useful blocks only in positions where the other of the two or more pages do not.

5. The method of claim 3, wherein the two or more pages are compatible with each other if:
   (a) they each have useful blocks only in positions where the other of the two or more pages do not; or
   (b) by reversing the positions of one or more of the two or more pages, the two or more pages have useful blocks only in positions where the other of the two or more pages do not.

6. The method of claim 3, wherein the two or more pages are compatible with each other if the useful blocks in each of the two or more pages could be placed in a single page.

7. The method of claim 1, wherein the method is performed when an access of the first memory results in a miss that requires the retrieval of a page from the second memory and the first memory is full.

8. A method for managing memory in a hybrid memory system, wherein the hybrid memory system has a first memory and a second memory, wherein the first memory is smaller than the second memory, and wherein the first and second memories are of different types, the method comprising:
   receiving a memory request;
   attempting to serve the memory request by accessing the first memory;
   when the first memory cannot fulfill the memory request:
      retrieving a memory page from the second memory, wherein the memory page can fulfill the memory request;
      copying the memory page in the first memory;
      determining if the first memory is full;
   when the first memory is not full:
      storing the newly copied memory page in the first memory;
   when the first memory is full:
      determining whether there are two or more pages in the first memory that are compatible with each other based at least in part on a prediction of when individual blocks within each of the two or more pages will be accessed;
   when there are compatible pages:
      merging the compatible pages, storing the merged page at one location in the first memory; and
      storing the newly copied memory page in the first memory;
   when there are no compatible pages:
      evicting a page from first memory; and
      storing the newly copied memory page in the first memory.

9. The method of claim 8, wherein the prediction of when individual blocks within each of the two or more pages will be accessed is based on a least-recently-used (LRU) algorithm.

10. A hybrid memory system comprising:
    a first memory;
    a second memory, wherein the second memory is of a different type than the first memory and is larger than the first memory; and
    a memory controller configured to:
       identify two or more pages in the first memory that are compatible with each other based at least in part on a prediction of when individual blocks within each of the two or more pages will be accessed;
       merge the two or more compatible pages, producing a merged page; and
       store the merged page in the first memory.

11. The hybrid memory system of claim 10, wherein the first memory is faster to access than the second memory.

12. The hybrid memory system of claim 11, wherein the first memory is Dynamic Random Access Memory (DRAM) and the second memory is Phase Change Memory (PCM).

13. The hybrid memory system of claim 10, wherein the memory controller includes a memory controller queue and a tag table, wherein the tag table indexes merged pages in the first memory, wherein each merged page has at least two corresponding tags and a mask in the tag table, wherein each of the at least two corresponding tags identifies a different page in the first memory, and wherein the mask identifies which blocks within the merged page correspond to which identified different page.

14. The hybrid memory system of claim 10, wherein the two or more compatible pages are identified by first selecting pages that are at the top of a least-recently-used (LRU) stack, wherein each entry in the LRU stack contains a pointer to a page in the first memory.

15. An apparatus for managing memory in a hybrid memory system, wherein the hybrid memory system has a first memory and a second memory, wherein the first memory is smaller than the second memory, and wherein the first and second memories are of different types, the apparatus comprising:
- means for identifying two or more pages in the first memory that are compatible with each other based at least in part on a prediction of when individual blocks within each of the two or more pages will be accessed;
- means for merging the two or more compatible pages, producing a merged page; and
- means for storing the merged page in the first memory.

16. The apparatus of claim 15, wherein the prediction of when individual blocks within each of the two or more pages will be accessed includes a determination of whether the individual blocks have not been written back from the first memory.

17. A non-transitory program storage device readable by a machine tangibly embodying a program of instructions executable by the machine to perform a method for managing memory in a hybrid memory system, wherein the hybrid memory system has a first memory and a second memory, wherein the first memory is smaller than the second memory, and wherein the first and second memories are of different types, the method comprising:
- identifying two or more pages in the first memory that are compatible with each other based at least in part on a prediction of when individual blocks within each of the two or more pages will be accessed;
- merging the two or more compatible pages, producing a merged page; and
- storing the merged page in the first memory.

18. The non-transitory program storage device of claim 17, wherein the identifying includes:
- identifying useful blocks within each of the two or more pages, wherein a useful block is one that is predicted to be accessed within a certain time period.

19. The non-transitory program storage device of claim 18, wherein the two or more pages are compatible with each other if they each have useful blocks only in positions where the other of the two or more pages do not.

20. The non-transitory program storage device of claim 18, wherein the two or more pages are compatible with each other if:
- (a) they each have useful blocks only in positions where the other of the two or more pages do not; or
- (b) by reversing the positions of one or more of the two or more pages, the two or more pages have useful blocks only in positions where the other of the two or more pages do not.

* * * * *